(12) United States Patent
Schroeder et al.

(10) Patent No.: US 10,176,457 B2
(45) Date of Patent: Jan. 8, 2019

(54) SYSTEM AND METHOD AUTOMATICALLY LEARNING AND OPTIMIZING SEQUENCE ORDER

(71) Applicants: Axel Schroeder, Dresden (DE); Martin Knechtel, Dresden (DE)

(72) Inventors: Axel Schroeder, Dresden (DE); Martin Knechtel, Dresden (DE)

(73) Assignee: SAP SE, Walldorf (DE)

( * ) Notice: Subject to any disclaimer, the term of this patent is extended or adjusted under 35 U.S.C. 154(b) by 657 days.

(21) Appl. No.: 14/615,284

(22) Filed: Feb. 5, 2015

(65) Prior Publication Data

US 2016/0232448 A1    Aug. 11, 2016

(51) Int. Cl.
*G06F 17/30* (2006.01)
*G06Q 10/10* (2012.01)

(52) U.S. Cl.
CPC ........... *G06Q 10/10* (2013.01); *G06Q 10/107* (2013.01)

(58) Field of Classification Search
CPC .............................. G06Q 10/10; G06Q 10/107
See application file for complete search history.

(56) References Cited

U.S. PATENT DOCUMENTS

| | | | |
|---|---|---|---|
| 7,283,846 B2 | 10/2007 | Spriestersbach et al. | |
| 7,427,023 B2 | 9/2008 | Suenbuel | |
| 8,306,862 B2 | 11/2012 | Weiler et al. | |
| 8,516,001 B2 | 8/2013 | Parks | |
| 8,756,120 B2 | 6/2014 | Ntawanga et al. | |
| 8,887,044 B1 | 11/2014 | Goodspeed et al. | |
| 2002/0026380 A1* | 2/2002 | Su | G06Q 30/06 705/26.8 |
| 2006/0078856 A1 | 4/2006 | Kellman | |
| 2008/0082463 A1* | 4/2008 | Cheng | G06N 99/005 706/12 |
| 2008/0082466 A1* | 4/2008 | Meijer | G06N 99/005 706/12 |
| 2012/0143495 A1 | 6/2012 | Dantu | |
| 2012/0245952 A1 | 9/2012 | Halterman et al. | |
| 2013/0080289 A1* | 3/2013 | Roy | G06Q 10/10 705/26.8 |

(Continued)

*Primary Examiner* — Tarek Chbouki
*Assistant Examiner* — Eddy Cheung
(74) *Attorney, Agent, or Firm* — Fountainhead Law Group P.C.

(57) ABSTRACT

Embodiments relate to apparatuses and methods configured for automatic learning and/or optimizing an order of items appearing in a sequence. Particular embodiments employ an engine to recognize sequences (e.g., lists of items) repeatedly encountered by a user. Examples of such sequences can include grocery lists, and emails present in an in-box. The engine then references available metadata associated with the sequence and its items, in order to present the user with an optimized sequence tailored to one or more criteria. Examples of available metadata can include sensed location information (of the user and/or other entities), temporal information, contextual influences, historical actions by the user, and/or general population habits (e.g., as may be determined via crowdsourcing). Certain embodiments may further generate a modified sequence based upon suggestions afforded by metadata associated with the sequence. Embodiments may utilize a self-learning scoring algorithm to perform sequence recognition, optimization, and/or modification.

15 Claims, 4 Drawing Sheets

(56) References Cited

U.S. PATENT DOCUMENTS

| | | |
|---|---|---|
| 2013/0268593 A1 | 10/2013 | Parekh |
| 2013/0339345 A1 | 12/2013 | Soto Matamala et al. |
| 2014/0032453 A1 | 1/2014 | Eustice et al. |
| 2014/0036768 A1 | 2/2014 | Gao et al. |
| 2014/0067564 A1* | 3/2014 | Yuan .................. G06Q 30/0633 705/16 |
| 2014/0106318 A1 | 4/2014 | Wright |
| 2014/0122209 A1 | 5/2014 | Argue et al. |
| 2014/0278650 A1 | 9/2014 | Bagheri et al. |
| 2014/0351078 A1* | 11/2014 | Kaplan .............. G06Q 30/0631 705/26.7 |
| 2015/0154286 A1* | 6/2015 | Lightner ................ G06F 19/24 707/728 |
| 2015/0379733 A1* | 12/2015 | Dorner ............... G06Q 30/0623 382/164 |
| 2016/0253710 A1* | 9/2016 | Publicover ............. H04W 4/21 705/14.66 |

* cited by examiner

SYSTEM AND METHOD AUTOMATICALLY LEARNING AND OPTIMIZING SEQUENCE ORDER

BACKGROUND

Unless otherwise indicated herein, the approaches described in this section are not prior art to the claims in this application and are not admitted to be prior art by inclusion in this section.

Embodiments relate to data processing, and in particular, to systems and methods employing automatic learning and/or optimization of sequences.

Sequences of items arranged in an order, are frequently encountered in ordinary life. One example is a sequence in which items are ticked off of a grocery list. Other examples of repeated sequences may be an order in which emails are read upon opening up an in-box, and a sequence of activities to complete a project.

Typically, upon encountering a familiar situation (e.g., grocery trip, in-box opening, repeat project assignment), an individual will simply manually create a relevant sequence based upon past experience and intuition. Such an informal approach to sequence building, however, may not be optimal.

In particular, the manual exercise of discretion to create a sequence may not be reproducible. Moreover, such manual action may leverage off of a limited pool of information (e.g., in the user's memory), when in fact substantial additional relevant contextual information may be available to the user.

SUMMARY

Embodiments relate to apparatuses and methods configured for automatic learning and/or optimizing an order of items appearing in a sequence. Particular embodiments employ an engine to recognize sequences (e.g., lists of items) repeatedly encountered by a user. Examples of such sequences can include grocery lists, and emails present in an in-box. The engine then references available metadata associated with the sequence and its items, in order to present the user with an optimized sequence tailored to one or more criteria. Examples of metadata that may be considered for optimization can include sensed location information (of the user and/or other entities), temporal information, contextual information, historical information based on previous actions by the user, and/or general population habits (e.g., as may be determined via crowdsourcing). Certain embodiments may further generate a modified sequence based upon suggestions afforded by metadata associated with the sequence. Embodiments may utilize a self-learning scoring algorithm for sequence recognition, optimization, and/or modification.

An embodiment of a computer-implemented method comprises, an engine receiving a first sequence comprising a plurality of items in a first order, one or more of the items having an attribute. The engine identifies available metadata relevant to the first sequence. The engine processes the first sequence and the available metadata according to a criterion of the attribute to generate a second sequence, and the engine communicates the second sequence to a user.

An embodiment of a non-transitory computer readable storage medium embodies a computer program for performing a method comprising an engine receiving a first sequence comprising plurality of items in a first order, one or more of the items having an attribute. The engine processes the first sequence to recognize a sequence type. The engine identifies available metadata relevant to the first sequence. The engine processes the first sequence and the available metadata according to a criterion of the attribute determined from the sequence type to generate a second sequence. The engine communicates the second sequence to a user.

An embodiment of a computer system comprises one or more processors and a software program executable on said computer system. The software program is configured to cause an engine to receive a first sequence comprising a plurality of items in a first order, one or more of the items having an attribute. The engine identifies available metadata relevant to the first sequence, the available metadata selected from behavior of the user, crowdsourced data, or sensor data. The engine processes the first sequence and the available metadata according to a criterion of the attribute, to generate a second sequence. The engine communicates the second sequence to a user.

In certain embodiments the processing comprises recognizing the first sequence as a type previously encountered by the user, and changing the first order according to the criterion determined by the type.

Some embodiments further comprise the engine processing the second sequence according to a suggestion to generate a third sequence, and the engine communicating the third sequence to the user.

According to particular embodiments the available metadata comprises behavior of the user.

In various embodiments the available metadata comprises crowdsourced data.

In some embodiments the available metadata comprises sensor data.

Certain embodiments may further comprise storing the second sequence as a database object.

In various embodiments the processing is according to a self-learning scoring algorithm.

In particular embodiments the second sequence comprises the items of the first sequence in a second order different from the first order.

In certain embodiments the second sequence comprises an item different from the first sequence.

The following detailed description and accompanying drawings provide a better understanding of the nature and advantages of embodiments.

DETAILED DESCRIPTION

Described herein are systems and methods for automatic learning and optimization of sequences according to various embodiments. In the following description, for purposes of explanation, numerous examples and specific details are set forth in order to provide a thorough understanding of the present invention. It will be evident, however, to one skilled in the art that embodiments of the present invention as defined by the claims may include some or all of the features in these examples alone or in combination with other features described below, and may further include modifications and equivalents of the features and concepts described herein.

Embodiments relate to apparatuses and methods configured for automatic learning and/or optimizing of repeatedly encountered sequences. Particular embodiments employ an engine to recognize sequences (e.g., lists of items). The engine then references available existing contextual data, in order to present the user with an optimized sequence that is tailored to one or more criteria. Examples of such metadata can include but are not limited to location information (of the user and/or other entities), contextual influences, historical actions of the user, and/or general population habits (e.g., as may be determined via crowdsourcing). Certain embodiments may further generate a modified sequence based upon suggestions afforded by available additional information.

Figure 1:
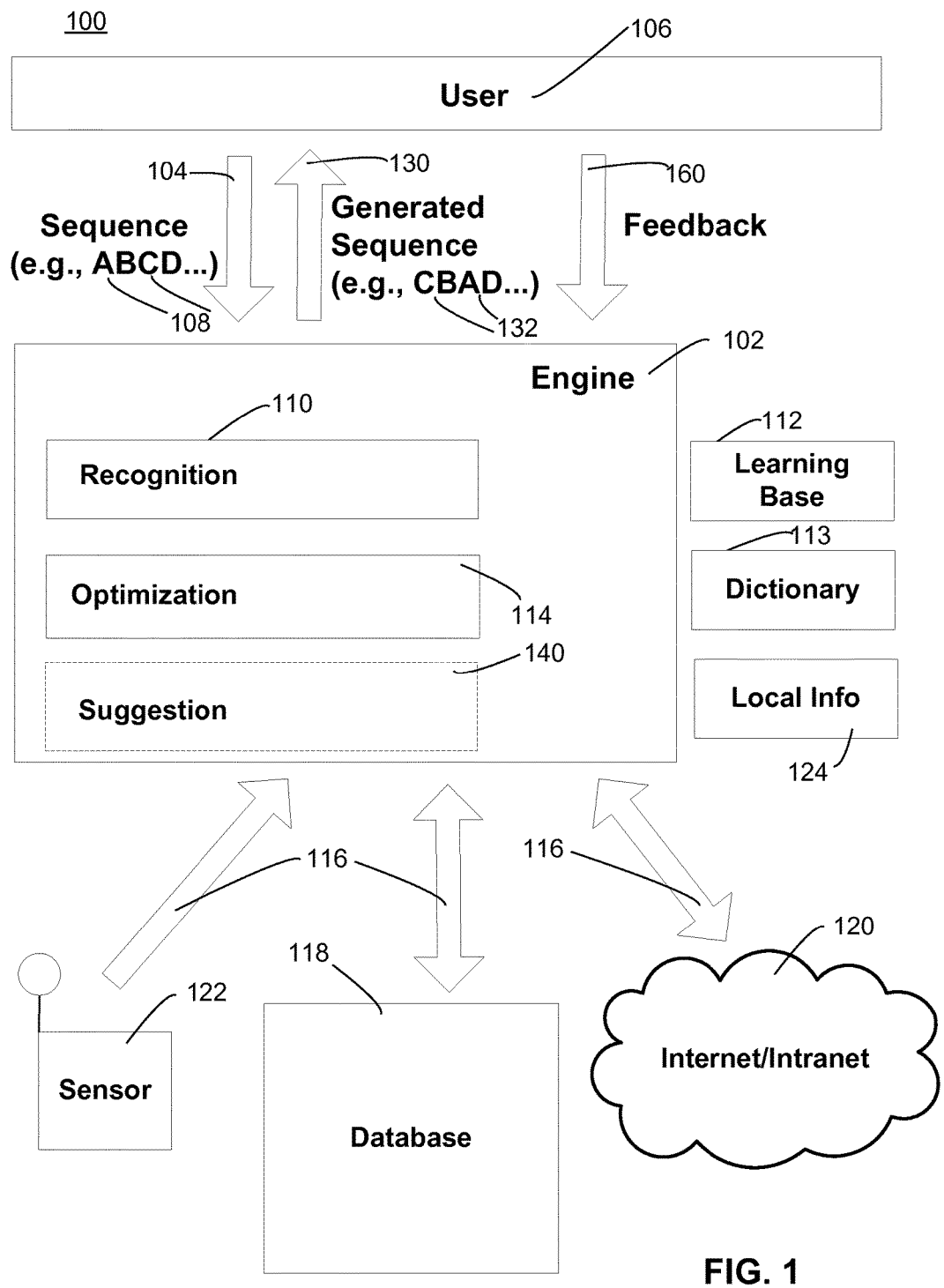
FIG. 1 is a simplified view of an embodiment of a system configured to perform automatic learning and optimization of sequences.

FIG. 1 is a simplified view of an embodiment of a system 100 that may be used for sequence learning and optimization. Specifically, processing engine 102 is configured to receive an original sequence 104 from a user 106.

Here, for purposes of illustration the original sequence is simplistically labeled as a sequence of items 108 ABCD. These items ABCD are arranged according to an attribute (e.g., an order of their appearance in the alphabet).

In practice, however, the sequence may comprise a much larger number of items, each exhibiting a complex structure with a variety of different possible attributes (e.g., an email list of messages having a sender, receipt(s), date/time, subject line etc.; or, a grocery list comprising text strings identifying specific products/brands, etc.)

The engine is configured to receive the original sequence, and to recognize same as belonging to a type previously encountered by the user. For example, the engine may be configured to perform text analysis of the input sequence, and recognize therein elements such as "To:", "From:" "cc:", specific names, etc., that are characteristic of the sequence being a list of email messages.

Such a recognition process may be performed by a recognition module 110 according to a particular algorithm. In some embodiments this sequence recognition function could be part of a learning process based upon knowledge acquired over time by the engine. As part of such a learning process, the recognition module could reference a learning base 112 compiled from previously successful recognition of list type, confirmed by the user. In addition to including past recognition results, such as learning base could comprise scores and/or rankings reflecting the relative accuracy of past recognition efforts.

The module 110 may reference data in addition to the learning base, during the process of accurately performing the recognition function. For example, the learning base may receive information from a dictionary 113.

Such a dictionary could be useful in allowing the engine to correlate descriptive information with particular attributes, for example through a matching process. In one example, the dictionary could be referenced to recognize the text string TIDE® as referring to a commercial household detergent product in a grocery list.

Once an original sequence is recognized as belonging to a particular type (e.g., in-box list, grocery list, etc.) by the recognition module, the engine may then operate to accurately generate a new, optimized sequence with a revised order of item appearance. This revised order may be determined according to one or more particular criteria, as processed by an optimization module 114.

In particular, the optimization module is configured to reference various metadata information 116 associated with the original sequence, the items contained therein, and/or particular attributes of those items. Examples of such criterion can include but are not limited to geographic, temporal, historical information specific to the user, historical actions not specific to the user, predetermined rules, and others.

As evident from this description, the type of sequence recognized by the engine, may influence the manner of its subsequent optimization. For example recognition of a sequence to be an email list, may result in different criteria being considered for optimization than if the sequence was instead recognized as a grocery list.

As shown in FIG. 1, sequence-relevant metadata may be available from a variety of sources. One possible source of metadata is a database 118.

Such a database may store historical information, such as past optimization efforts (e.g., previous changes made by the user to an order of appearance of items in a sequence of a particular type). Such database data could thus indicate that a user has previously moved emails from a certain sender to earlier in the sequence, indicating relative importance of those messages. The optimization criterion in such an instance would be the identity of the sender of the email.

Again, such criterion could offer different relevance for optimizing a sequence of a different type (e.g., a grocery list primarily comprising items rather than personal names). However processing according to embodiments should desirably be flexible, for example as may be imparted by learning algorithms. Thus the personal name PAUL NEWMAN may be quite relevant to optimize an order of items a grocery list, given this name's association with a popular brand of food products.

Of course, many other criteria could be stored in a database and referenced by the engine for purposes of sequence optimization. Thus in the email in-box environment, such criteria could include key words recognized in the message subject and/or body, date/time of receipt, recipients, etc. Access to such optimization-relevant metadata information may be enhanced by the structure of the database in which stored data objects are stored in an organized manner.

As shown in FIG. 1, the engine may not only receive information from the engine, but may also communicate information back to the database for storage therein. For example, historical sequence recognition and/or optimization events may be updated with latest information (e.g., current metadata and recognition/optimization decisions based thereon), thereby ensuring an ongoing accuracy of those functions.

In addition to information from a database, FIG. 1 also shows that the engine may further receive sequence-associated metadata from other sources. One such source is the internet 120. Thus in one example, the engine could trigger searching for information available from the internet, based upon one or more key words of a sequence item.

In another example, the engine could reference the internet to access specific information available from particular sources. Thus where an original sequence is recognized as a grocery list, and past user activity indicates shopping at a particular store location, associated metadata representing the arrangement (e.g., by aisle, shelf) of goods in the grocery store may be accessed via the grocery store's website.

In the simplified view of FIG. 1, the manner of information transfer 116 with the internet is shown as bidirectional.

In this manner, metadata and/or computed optimization results can be shared and provided as crowd sourcing information.

Still other sources of sequence-relevant metadata are possible. For example, FIG. 1 further shows the engine receiving associated information from a sensor 122. One possible candidate for such a sensor could be a Global Positioning System (GPS) sensor, such as may be located in a user's portable electronic device. The sensor data may be communicated to the engine to serve as a basis for sequence optimization based upon a geographic criterion.

Accordingly a sequence in the form of a grocery list could be optimized based upon associated metadata indicating a user's location near one store than another store having a different arrangement of products. Similarly, an email inbox list could be optimized to list emails from senders in closer proximity to the user's current location.

Thus a salesman on a business trip to Asia may have emails received from Asian customers listed earlier in the sequence, than emails received from others from more distant locales. This example shows the use of multiple criteria for sequence optimization, with both geographic location and sender classification (e.g., customer rather than vendor or co-worker) considered for optimization. Where multiple criteria are referenced, embodiments may assign a different weight to these criteria according to their relative significance.

Biometric sensors (e.g., measuring heart rate, blood oxygen content, blood sugar, others) represent other possible sources of sequence-relevant metadata. In a health care milieu, a doctor presented with an original sequence of items representing a diagnosis path, could optimize that sequence based upon current/past received biometric data of a patient.

Sequence-relevant metadata need not be stored remotely, and alternatively may be local information 124. An example of such locally stored information may be that cached on the user's portable device, such as that transmitted in a limited range within a particular facility.

It is further emphasized that the engine itself is not limited to being present in any particular location. In certain embodiments the engine could be located with the user, for example on the user's portable device such as a smart phone or tablet. According to alternative embodiments the engine could be remotely located, receiving original sequence data and associated metadata relevant thereto, from a plurality of remote sources. In some embodiments the engine could be distributed across a local device and a remote server interacting therewith.

Once a new sequence 130 has been generated by the engine based upon consideration of various criteria, it is communicated back to the user for review. Here, the highly simplified example shows that the generated sequence comprises items 132 in the new order CBAD, reflecting the consideration of criteria based upon sequence-relevant associated metadata.

The generated sequence may be stored locally with the engine. The generated sequence may also be stored remotely, for example in a separate database as mentioned above.

It is noted that FIG. 1 further shows a feedback channel 160 from the user to the engine. This channel allows the communication of feedback on optimized sequences.

In particular, a learning process according to an embodiment may allow comparing the optimized sequences with the user's specific behavior. For example, is the user really reading emails in the optimized order, or is he still skipping mails?

This feedback can go back to the engine as one of the data sources used to improve the scoring algorithm. That is, the feedback can help determine how scoring can to tuned to better fit the actual reading sequence of the user.

While the above discussion has focused upon an engine performing sequence recognition and optimizing an order of items appearing in an original sequence, embodiments are not limited to this functionality. Certain embodiments may modify a sequence in order to include additional items not originally present.

Specifically, FIG. 1 shows the engine as optionally further comprising a suggestion module 140. The suggestion module is configured to receive a sequence, which may be an original sequence received from the user, or may be an optimized sequence from the optimization module.

The suggestion module then references a source of information in order to process the received sequence, generating a modified sequence therefrom. This modified sequence may include items of the sequence received, and may further include additional items or substituted new items.

For example, the suggestion module could access via the internet, a specific site administered by a third party. In one implementation, the specific site could be operated by a particular grocery store chain of which the user is a frequent/preferred customer.

Here, the engine could receive from the third party site, information that the grocery store is out of stock of a particular item on the user's current grocery list. Based on this information, the suggestion module could match the unavailable item to an available alternative, and generate a modified grocery list including the alternative item. The presence of a substitution could be afforded to the user in one or more ways, for example through color, font size, font appearance, etc. That modified list could be sent to the user as the generated sequence 130.

In another embodiment, the engine could receive from the third party site, information that the grocery store is offering a particular item at a discount. Based on this information, the suggestion module could match the sale item to an existing item on the grocery list. Then, the engine would generate a modified list including the sale item as an alternative to the listed item. That modified list could be sent to the user as the generated sequence 130, again with the sequence modifications afforded in one or more ways.

Figure 2:
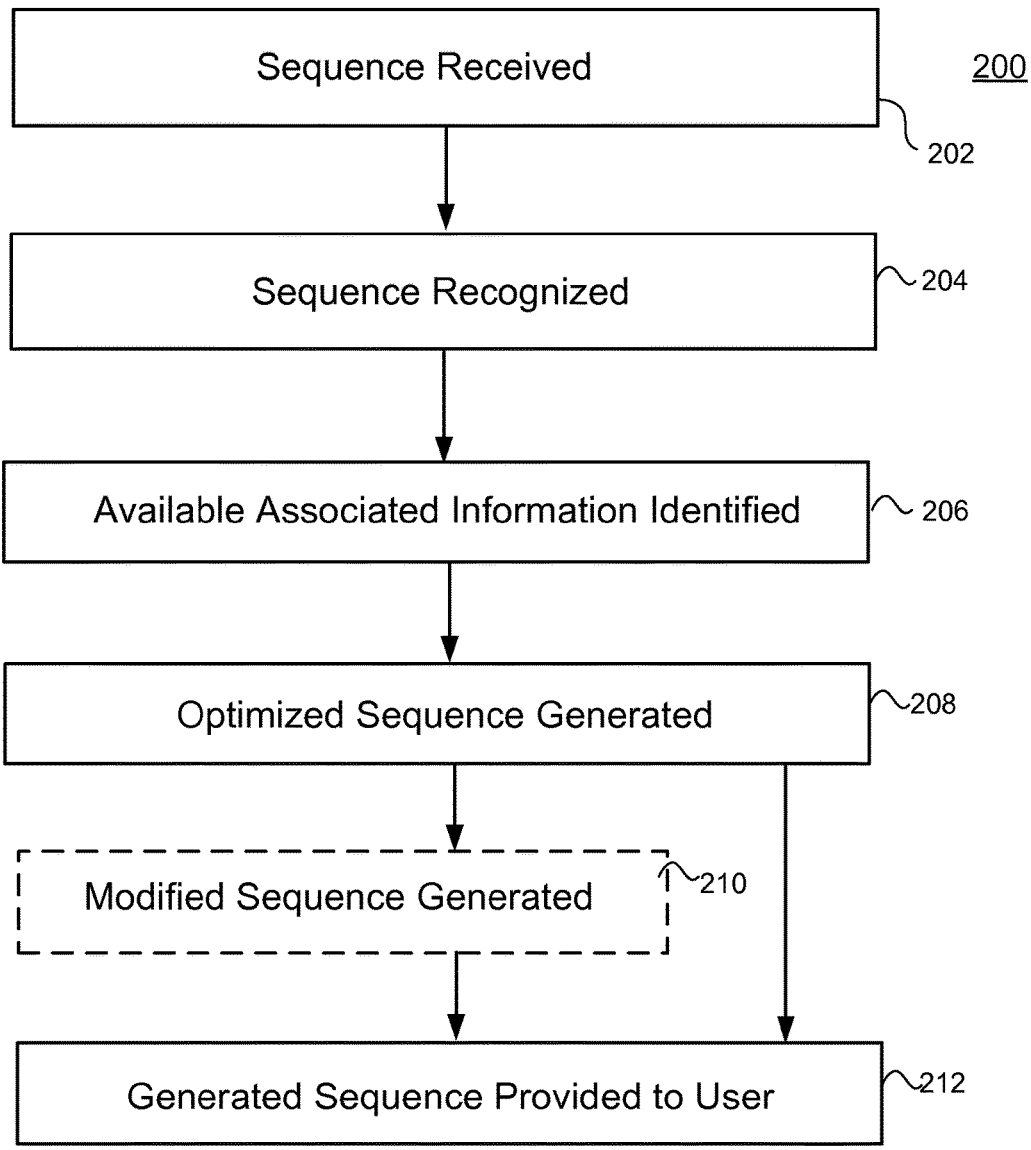
FIG. 2 is a simplified flow diagram of a process according to an embodiment.

FIG. 2 is a simplified flow diagram showing a method 200 of providing decision support according to an embodiment. In a first step 202, a sequence of items that comprise one or more attributes, is received by an engine.

In a second step 204, the engine recognizes the sequence as being of a particular type. In some embodiments, this recognition may be part of a learning process.

In a third step 206 associated metadata relevant to the sequence, is identified by the engine. In a fourth step 208 the engine processes the sequence according to associated metadata information to generate an optimized sequence.

In an optional fifth step 210, the engine processes the original sequence or the optimized sequence to generate a modified sequence.

In a sixth step 212, the generated sequence (i.e., the optimized sequence and/or the modified sequence) are provided to a user.

Further details regarding sequence learning and optimization are now provided in connection with the following specific examples.

EXAMPLE 1

Email In-Box

One example of learning and optimization of a repeated sequence according to an embodiment, is now presented in connection with an email in-box. In particular, an email inbox at an email client, is a familiar portal for receiving communications.

Under certain circumstances, a user may simply move through the sequence of in-box emails according to an order in which they are displayed. This typically may be with the latest received email displayed first in the sequence.

However, stored tracked information regarding the user's historical behavior, could reveal the user to deviate from the sequence presented. For example, available information could indicate the user to consistently read E-Mail from certain senders first.

Based on that additional available information, an engine according to an embodiment herein could process the sequence from the in-box to provide an optimized sequence. For example, the optimized sequence could display earlier in the sequence, emails originating from the important senders. Emails from other senders could be provided later in the sequence.

Of course, while the example describes learning/optimization of a sequence of received emails based upon the criterion of initial user access, this represents only one possible embodiment. Alternatives could rely upon other available metadata information in order to optimize such a sequence.

Examples of other criterion for sequence optimization may include but are not limited to: a duration of user review of emails, types of email deleted quickly, subject line, message length, existence of a priority flag, and others. Such observed user behavior information may then be used to adjust the sequence of incoming E-Mails, for example by execution of a self-learning scoring algorithm.

It is noted that this particular embodiment relates to optimizing a sequence in the form of messages available from an in-box of an email client. The processing that accompanies the sequence learning and optimization, however, may occur on that client or elsewhere, for example on a remote server communicating with a client.

Thus in a smart phone example, the engine that performs the optimization may be located internal to the mobile device, or may be located remotely. The latter approach may promote the utilization of a large variety of associated information not necessarily readily available locally to a particular user and/or device.

EXAMPLE 2

Grocery List

A second example of sequence learning and optimization according to an embodiment, relates to a personal checklist such as a grocery list.

Maintaining a grocery list on a smartphone is quite common today. Such an approach may offer benefits, including but not limited to the ability to synchronize the list amongst several persons (e.g., a buyer and a caregiver), and monitoring whether some items on a shared list are bought/ticked off already by another participant (e.g., a child or spouse sent off to a distant supermarket aisle or even to another supermarket altogether).

According to embodiments, an engine may reference associated available knowledge to generate an optimized sequence. One form of such associated knowledge which may be used for that purpose, is historical knowledge.

Based upon knowledge of previous grocery sequences, the engine may know an order in which items are ticked off the list. According to this knowledge, the sequence of items in the grocery list can be optimized. Such an application could be of particular value for users who always purchase their items in the same supermarket location, as they consistently progress in a known direction through the aisles of the store.

Apart from historical activities, other types of information associated with a sequence, can be referenced for purposes of optimization. One such type of associated information may be obtained from crowdsourcing.

For example, the pickup sequence for a grocery list can depend on various factors, including but not limited to context, domain, user profile, etc. Where, however, enough users are working with such lists, an algorithm executed by the engine can select a closest set of matches. Such matches can be the grocery lists of users in the same context, domain, user profile, etc. The optimized order of such other grocery lists can be referenced as additional available metadata information useful in the process of sequence optimization.

Sharing a ticked off sequence with a community, can result in further advantages for buyers. For instance, when visiting a supermarket that the user has never been to before, a grocery list may be presorted automatically according to the sequence of goods of that supermarket.

Another possible benefit that may arise from crowdsourcing, is the ability to predict whether the items would be available at a particular location. Thus by accessing crowdsourced grocery lists, a user could be notified in advance of the unavailability of a particular produce at the store, thereby allowing proactive behavior to visit another location in which product availability is assured.

In addition, shared sequences may allow for improving and correcting sequences for each store. An example could account for the fact that the store owner has rearranged the manner of physical placement of products.

It is further noted that a grocery list sequence represents a route through the supermarket. Accessing crowdsourcing information may offer insight for supermarket owners. Based on that information, the supermarket might improve signage and use the lists for product placement, advertising, and special offers.

It is noted that users may have different names for the same product (e.g. "Haribo" vs. "gummy bear") in the same list. Accordingly, the utilization of a controlled vocabulary operating in the background could help further refine the learning process. This may implemented, for example, by matching employing a dictionary component.

In addition to or in lieu of historical data or crowdsourced data, other types of associated information for optimizing a sequence, may be available. One example of such information is sensor data.

As mentioned previously, GPS data (of the user or of another entity) is one type of sensor information that may be available for sequence optimization. A GPS location can be used to distinguish between several supermarkets.

Such use of available geographical information may help for optimization by differentiating relevant information by location. This avoids, for example that a sequence obtained by crowdsourcing for one supermarket chain, is used for another supermarket chain where items appear in a different order.

Sensed geographic data may further allow identifying different product assortments based on the current supermarkets. These product assortments can be used to suggest alternative items, in case one or more products on the grocery list are not available. This suggestion can be provided by using product categories or similarity algorithms.

Sensed geographic data could also be employed in sequence optimization to promote cheaper products based upon local discounts and the like. Also, crowdsourcing information may be utilized with greater precision if lists from only one store are compared with each other.

Data other than from GPS data, may be relied upon for sequence optimization. Examples can include data from in house navigation sensors, iBeacons, Near Field Communication (NFC), and others.

Thus in the grocery list example, supermarket owners might improve the customer experience by adding indoor positioning systems. Accordingly iBeacons may offer routing to indicate a user should "go ahead" or "go back" for the next item on the grocery list. Sequence optimization may allow advertisements to be planted more effectively, tailored towards the customer.

Figure 3:
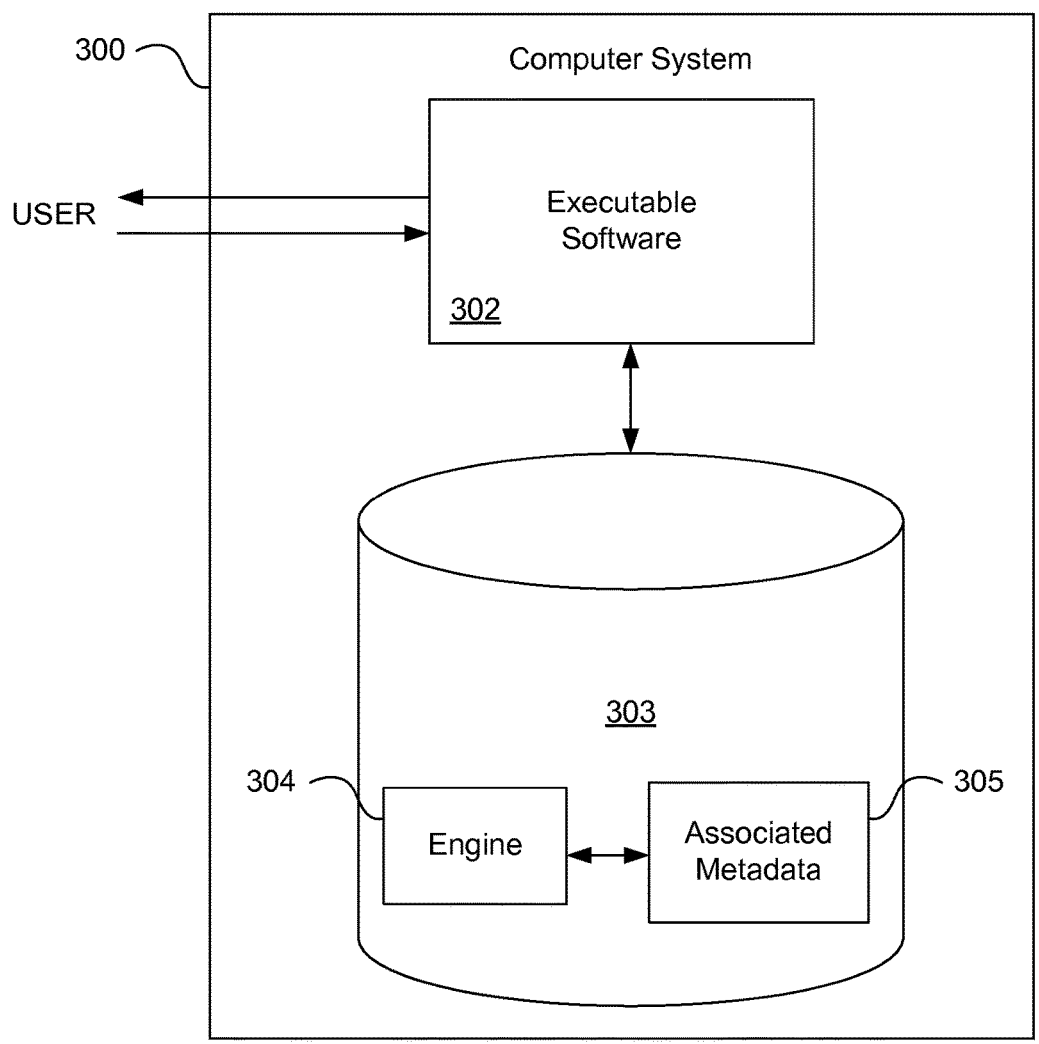
FIG. 3 illustrates hardware of a special purpose computing machine configured to perform automatic sequence learning and optimization according to an embodiment.

FIG. 3 illustrates hardware of a special purpose computing machine configured to perform automatic learning and optimization of sequences according to an embodiment. In particular, computer system 301 comprises a processor 302 that is in electronic communication with a non-transitory computer-readable storage medium 303. This computer-readable storage medium has stored thereon code 305 corresponding to associated metadata. Code 304 corresponds to an engine. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

It is noted that in the specific embodiment of FIG. 3, the engine is shown as being part of the database. Such an embodiment can correspond to applications where processing is performed by a powerful engine available as part of an in-memory database (e.g., the HANA in-memory database available from SAP SE of Walldorf, Germany. However this is not required and in certain embodiments the engine may be implemented in other ways, for example as part of an overlying application layer.

Figure 4:
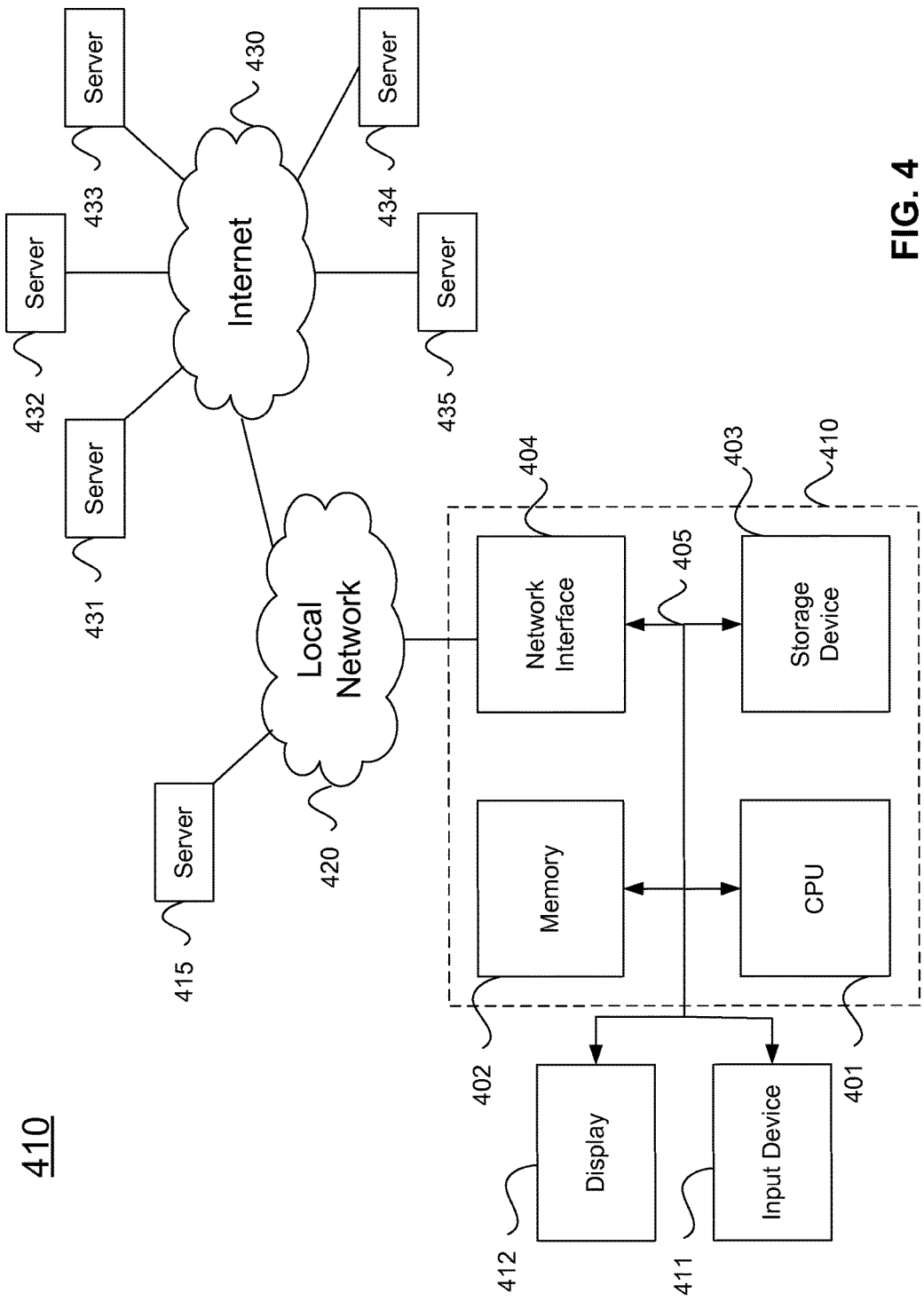
FIG. 4 illustrates an example of a computer system.

An example computer system 4 is illustrated in FIG. 4. Computer system 410 includes a bus 405 or other communication mechanism for communicating information, and a processor 401 coupled with bus 405 for processing information. Computer system 410 also includes a memory 402 coupled to bus 405 for storing information and instructions to be executed by processor 401, including information and instructions for performing the techniques described above, for example. This memory may also be used for storing variables or other intermediate information during execution of instructions to be executed by processor 401. Possible implementations of this memory may be, but are not limited to, random access memory (RAM), read only memory (ROM), or both. A storage device 403 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 403 may include source code, binary code, or software files for performing the techniques above, for example. Storage device and memory are both examples of computer readable mediums.

Computer system 410 may be coupled via bus 405 to a display 412, such as a cathode ray tube (CRT) or liquid crystal display (LCD), for displaying information to a computer user. An input device 411 such as a keyboard and/or mouse is coupled to bus 405 for communicating information and command selections from the user to processor 401. The combination of these components allows the user to communicate with the system. In some systems, bus 405 may be divided into multiple specialized buses.

Computer system 410 also includes a network interface 404 coupled with bus 405. Network interface 404 may provide two-way data communication between computer system 410 and the local network 420. The network interface 404 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 404 sends and receives electrical, electromagnetic, or optical signals that carry digital data streams representing various types of information.

Computer system 410 can send and receive information, including messages or other interface actions, through the network interface 404 across a local network 420, an Intranet, or the Internet 430. For a local network, computer system 410 may communicate with a plurality of other computer machines, such as server 415. Accordingly, computer system 410 and server computer systems represented by server 415 may form a cloud computing network, which may be programmed with processes described herein. In the Internet example, software components or services may reside on multiple different computer systems 410 or servers 431-435 across the network. The processes described above may be implemented on one or more servers, for example. A server 431 may transmit actions or messages from one component, through Internet 430, local network 420, and network interface 404 to a component on computer system 410. The software components and processes described above may be implemented on any computer system and send and/or receive information across a network, for example.

In conclusion, it is noted that embodiments are not limited to the aspects specifically addressed above, but can be extended by other factors as well, such as considering other types of sources of available associated information.

Multiple criteria can be considered by the engine in determining optimization. Any of the factors can be weighted according to their relevance in a specific context.

The aspects discussed above provide a pragmatic view on how information can be used to improve list sequences given to the specific domain, and directly improve the user's experience by reducing effort in managing information. Improving list sequences can also promote access to information and thus simplified decision-making in a wide variety of possible scenarios involving sequences of items.

Various building blocks identified below, and their possible benefits, are now summarized.

Crowdsourcing and/or similarity algorithms can optimize lists without having prior knowledge about a specific user. The use of data from sensors (e.g., GPS) can serve to provide contextual information. Such contextual information can comprise geographic information, temporal information, biometric information, and others.

The re-use of historical information can allow recognition of earlier user behavior. This permits the system to learn and apply its knowledge to the current user situation. Information aging can ensure that more recent information is considered more important than older information, constantly improving accuracy of results of the algorithms (e.g., self-learning scoring algorithms) applied by the engine.

Optimized lists can reduce the noise associated with too much information. This can reduce a quantity of unproductive user interaction, and allow more interactivity with additional information behind every list item.

The automatic personalization of user lists, reduces effort in manual information management and eases the lists usability overall. This may be particular useful for mobile applications, where poor lighting and distractions may reduce an ability to focus on details provided by a user interface.

Embodiments can support not only manual or user-involved processes but also fully automated processes. This is because more relevant information is served first to the user in the sequence.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
an in-memory database engine receiving a first sequence comprising a plurality of items in a first order, one or more of the items having an attribute;
the in-memory database engine storing the first sequence in an in-memory database remote from a mobile device;
the in-memory database engine recognizing the first sequence as a list of products for purchase in a facility;
the in-memory database engine identifying available first metadata including crowdsourced data relevant to the first sequence;
the in-memory database engine identifying available second metadata including internet data of an alternative product;
the in-memory database engine identifying available third metadata including internet data indicating an arrangement comprising an aisle location and a shelf location of the products and the alternative product in the facility;
the in-memory database engine storing the available first, second, and third metadata in the in-memory database;
the in-memory database engine processing the first sequence and the available first second, and third metadata according to a criterion of the attribute, to generate a second sequence, wherein the processing comprises the in-memory database engine,
performing a matching process with the crowdsourced data according to a dictionary located external to the in-memory database, to recognize the first sequence as a type previously encountered by the user, and changing the first order according to the criterion determined by the type;
the in-memory database storing the second sequence as a data object in the in-memory database; and
the in-memory database engine communicating the second sequence including the aisle location and the shelf location in the facility of each of the products and the alternative product to a user of the mobile device for caching.

2. The method as in claim 1 further comprising:
the in-memory database engine processing the second sequence according to a suggestion to generate a third sequence; and
the in-memory database engine communicating the third sequence to the user.

3. The method as in claim 1 wherein the available metadata further comprises behavior of the user.

4. The method as in claim 1 wherein the available metadata further comprises sensor data.

5. The method as in claim 1 wherein the processing is according to a self-learning scoring algorithm based upon information from the dictionary.

6. The method as in claim 1 wherein the second sequence comprises the items of the first sequence in a second order different from the first order.

7. The method as in claim 1 wherein the second sequence comprises an item different from the first sequence.

8. A non-transitory computer readable storage medium embodying a computer program for performing a method, said method comprising:
an in-memory database engine receiving a first sequence comprising a plurality of items in a first order, one or more of the items having an attribute;
the in-memory database engine storing the first sequence in an in-memory database remote from a mobile device;
the in-memory database engine recognizing the first sequence as a list of products for purchase in a facility;
the in-memory database engine processing the first sequence to recognize a sequence type;
the in-memory database engine identifying available first metadata relevant to the first sequence;
the in-memory database engine identifying available second metadata including internet data of an alternative product;
the in-memory database engine identifying available third metadata including internet data indicating an arrangement comprising an aisle location and a shelf location of the products and the alternative product in the facility;
the in-memory database engine storing the available first, second, and third metadata in the in-memory database;
the in-memory database engine processing the first sequence and the available first second, and third metadata according to a criterion of the attribute determined from the sequence type, to generate a second sequence, wherein the processing comprises the in-memory database engine,
performing a matching process with the crowdsourced data according to a dictionary located external to the in-memory database, to recognize the first sequence as a type previously encountered by the user, and changing the first order according to the criterion determined by the type;
the in-memory database storing the second sequence as a data object in the in-memory database; and
the in-memory database engine communicating the second sequence including the aisle location and the shelf location in the facility of each of the products and the alternative product to a user of the mobile device for caching, wherein the second sequence comprises an item different from the first sequence.

9. The non-transitory computer readable storage medium as in claim 8 wherein the method further comprises:
the in-memory database engine processing the second sequence according to a suggestion to generate a third sequence; and
the in-memory database engine communicating the third sequence to the user.

10. The non-transitory computer readable storage medium as in claim 8 wherein the available metadata further comprises behavior of the user.

11. The non-transitory computer readable storage medium as in claim 8 wherein the available metadata further further comprises sensor data.

12. The non-transitory computer readable storage medium as in claim 8 wherein the in-memory database engine recognizes the sequence type utilizing a self-learning scoring algorithm based upon information from the dictionary.

13. A computer system comprising:
one or more processors;
a software program, executable on said computer system, the software program configured to cause an in-memory database engine remote from a mobile device to:
receive a first sequence comprising a plurality of items in a first order, one or more of the items having an attribute;
store the first sequence in an in-memory database;
recognize the first sequence as a list of products for purchase in a facility;
identify available first metadata relevant to the first sequence, the available first metadata selected from behavior of the user, crowdsourced data, or sensor data;
identify available second metadata including internet data of an alternative product
identify available third metadata including internet data indicating an arrangement comprising an aisle location and a shelf location of the products and the alternative product in the facility;
store the available first, second, and third metadata in the in-memory database;
process the first sequence and the available metadata according to a criterion of the attribute, to generate a second sequence, the in-memory database engine,
performing a matching process with the crowdsourced data according to a dictionary located external to the in-memory database, to recognize the first sequence as a type previously encountered by the user, and
changing the first order according to the criterion determined by the type;
the in-memory database storing the second sequence as a data object in the in-memory database; and
communicate the second sequence including the aisle location and the shelf location in the facility of each of the products and the alternative product to a user of the mobile device for caching.

14. The computer system as in claim 13 wherein the software program is further configured to cause the in-memory database engine to,
process the second sequence according to a suggestion to generate a third sequence; and
communicate the third sequence to the user.

15. The computer system as in claim 13 wherein the processing is according to a self-learning scoring algorithm based upon information from the dictionary.

* * * * *